US010524011B2

(12) United States Patent
de Mello Maia

(10) Patent No.: US 10,524,011 B2
(45) Date of Patent: Dec. 31, 2019

(54) SYSTEMS AND METHODS FOR UTILIZING SOCIAL METRICS TO PROVIDE VIDEOS IN VIDEO CATEGORIES

(71) Applicant: Facebook, Inc., Menlo Park, CA (US)

(72) Inventor: Eduardo de Mello Maia, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 14/984,270

(22) Filed: Dec. 30, 2015

(65) Prior Publication Data
US 2017/0195733 A1   Jul. 6, 2017

(51) Int. Cl.
| | |
|---|---|
| *H04N 21/47* | (2011.01) |
| *H04N 21/4788* | (2011.01) |
| *H04N 21/84* | (2011.01) |
| *H04N 21/61* | (2011.01) |
| *H04N 21/254* | (2011.01) |
| *H04N 21/4627* | (2011.01) |
| *H04N 21/458* | (2011.01) |
| *H04N 21/258* | (2011.01) |
| *H04N 21/45* | (2011.01) |
| *G06Q 10/10* | (2012.01) |
| *G06Q 50/00* | (2012.01) |
| *H04N 21/482* | (2011.01) |
| *G06Q 30/02* | (2012.01) |

(52) U.S. Cl.
CPC ....... *H04N 21/4788* (2013.01); *G06Q 10/101* (2013.01); *G06Q 50/01* (2013.01); *H04N 21/2541* (2013.01); *H04N 21/25891* (2013.01); *H04N 21/458* (2013.01); *H04N 21/4532* (2013.01); *H04N 21/4627* (2013.01); *H04N 21/4826* (2013.01); *H04N 21/6125* (2013.01); *H04N 21/84* (2013.01); *G06Q 30/0251* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,396,195 | B1 * | 7/2016 | Beguelin | G06F 17/30053 |
| 2011/0258154 | A1 * | 10/2011 | Koppula | G06F 17/30899 |
| | | | | 706/46 |
| 2013/0347038 | A1 * | 12/2013 | Lee | H04N 21/4312 |
| | | | | 725/40 |

(Continued)

*Primary Examiner* — Pankaj Kumar
*Assistant Examiner* — Alazar Tilahun
(74) *Attorney, Agent, or Firm* — Sheppard Mullin Richter Hampton LLP

(57) ABSTRACT

Systems, methods, and non-transitory computer-readable media can identify a set of video categories. A first video content item can be acquired from a first user. A particular video category selected by the first user as being associated with the first video content item can be acquired from the first user. The particular video category can be selected out of the set of video categories. It can be determined that one or more videos associated with the particular video category are to be provided to a second user. The second user can be connected to the first user in a social networking system. The second user can be provided, via the social networking system, with access to the first video content item associated with the particular video category.

19 Claims, 9 Drawing Sheets

(56) References Cited

U.S. PATENT DOCUMENTS

| | | | |
|---|---|---|---|
| 2014/0068654 A1* | 3/2014 | Marlow | H04L 65/4084 |
| | | | 725/28 |
| 2014/0173642 A1* | 6/2014 | Vinson | G06Q 50/01 |
| | | | 725/9 |
| 2015/0319470 A1* | 11/2015 | Tang | H04N 21/2668 |
| | | | 725/34 |

* cited by examiner

SYSTEMS AND METHODS FOR UTILIZING SOCIAL METRICS TO PROVIDE VIDEOS IN VIDEO CATEGORIES

FIELD OF THE INVENTION

The present technology relates to the field of providing content. More particularly, the present technology relates to techniques for utilizing social metrics to provide videos in video categories.

BACKGROUND

Today, people often utilize computing devices (or systems) for a wide variety of purposes. Users can use their computing devices to, for example, interact with one another, access content, share content, and create content. In some cases, users can utilize their computing devices to generate, download, view, access, or otherwise interact with media content, such as images, videos, audio, and text. For example, users of a social networking system (or service) can load, stream, access, and/or share video content items by utilizing their computing devices.

In some instances, users can access, view, upload, and/or share various video content items, such as via a media sharing online resource. Under conventional approaches rooted in computer technology, video content items (i.e., videos) provided via media sharing online resources are often times curated, labeled, and/or categorized by third parties, such as by third party publishers. As a result, in many cases, conventional media sharing online resources can provide or present users with videos that are irrelevant or uninteresting to those users. Accordingly, conventional approaches can create challenges for or reduce the overall experience associated with utilizing, accessing, or interacting with media content such as videos.

SUMMARY

Various embodiments of the present disclosure can include systems, methods, and non-transitory computer readable media configured to identify a set of video categories. A first video content item can be acquired from a first user. A particular video category selected by the first user as being associated with the first video content item can be acquired from the first user. The particular video category can be selected out of the set of video categories. It can be determined that one or more videos associated with the particular video category are to be provided to a second user. The second user can be connected to the first user in a social networking system. The second user can be provided, via the social networking system, with access to the first video content item associated with the particular video category.

In an embodiment, a second video content item can be acquired from a third user. The particular video category selected by the third user as being associated with the second video content item can be acquired from the third user. The particular video category can be selected out of the set of video categories. The second user can be provided with access to the second video content item associated with the particular video category.

In an embodiment, an order for providing access to the first video content item and the second video content item can be determined based on one or more social metrics associated with at least one of the first user, the second user, or the third user.

In an embodiment, access to the first video content item and the second video content item can be provided to the second user via a particular video channel personalized for the second user. The particular video channel personalized for the second user can be associated with the particular video category.

In an embodiment, an option for removing or hiding, from the particular video channel, at least one of the first video content item or the second video content item can be provided to the second user.

In an embodiment, the first video content item and the particular video category can be acquired via the social networking system based on at least one of a post action by the first user, a share action by the first user, or a save action by the first user.

In an embodiment, the set of video categories can include at least one of a news video category, a comedy video category, a sports video category, a life video category, a travel video category, or an entertainment video category.

In an embodiment, identifying the set of video categories can further comprise calculating a respective popularity metric for each video category in a plurality of video categories. The set of video categories can be identified based on the respective popularity metric for each video category.

In an embodiment, identifying the set of video categories based on the respective popularity metric for each video category can further comprise selecting a specified quantity of video categories that have highest popularity metrics.

In an embodiment, identifying the set of video categories based on the respective popularity metric for each video category can further comprise selecting one or more video categories that have popularity metrics that at least meet a specified popularity metric threshold.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

DETAILED DESCRIPTION

Figure 1:
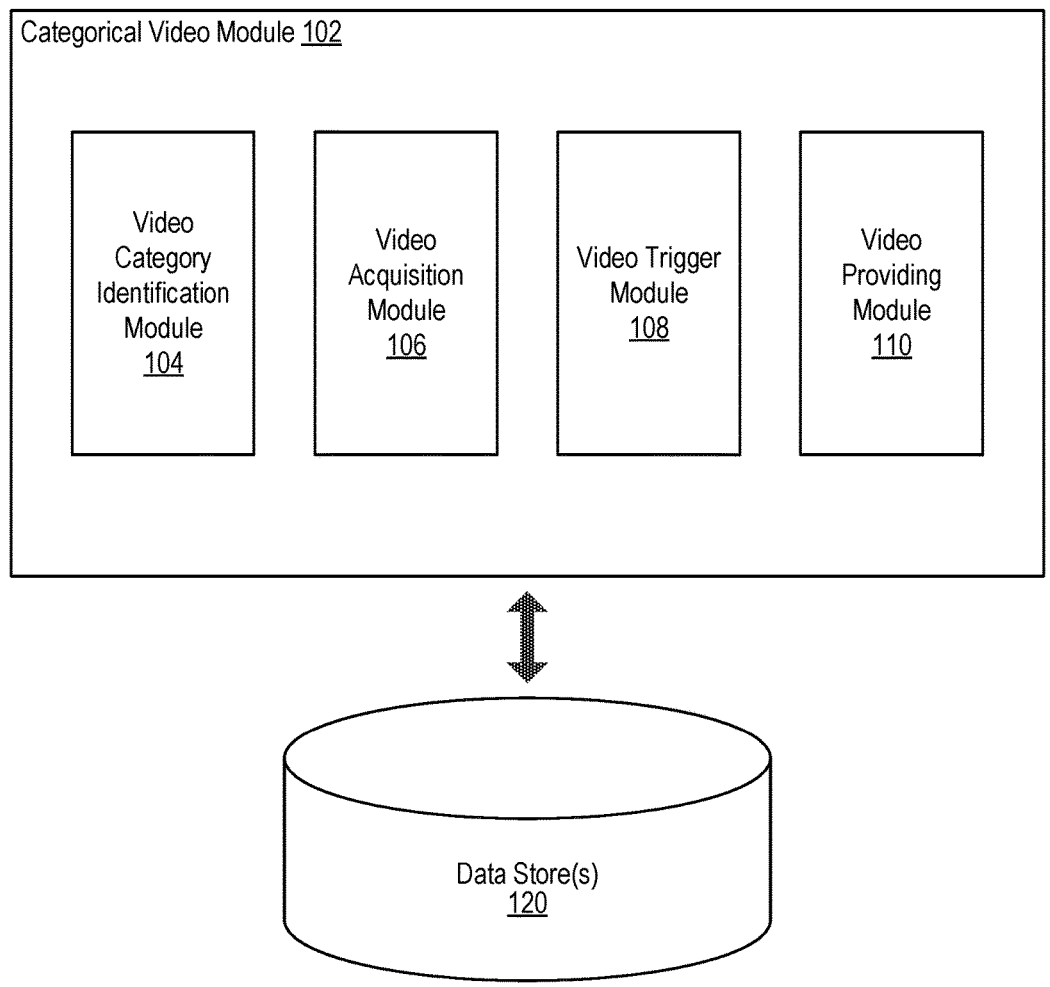
FIG. 1 illustrates an example system including an example categorical video module configured to facilitate utilizing social metrics to provide videos in video categories, according to an embodiment of the present disclosure.

Utilizing Social Metrics to Provide Videos in Video Categories

People use computing systems (or devices) for various purposes. Users can utilize their computing systems to establish connections, engage in communications, interact with one another, and/or interact with various types of content. In some cases, computing devices can include or correspond to cameras capable of capturing or recording media content, such as images or videos (including sets of video image frames or still frames). In some instances, computing devices can be utilized by users to view, edit, upload, and/or share media content items such as videos. For example, users can access a media sharing online resource via their computing devices in order to watch, provide, share, and/or otherwise interact with video content.

Conventional approaches rooted in computer technology for sharing videos online can attempt to categorize videos in a particular manner. For instance, under such conventional approaches, many third parties (e.g., third party publishers, video uploaders, etc.) can tag, label, or otherwise categorize videos as being associated with particular types, kinds, or categories of video. However, often times these videos categorized by third parties are not customized or personalized for viewing users. In one example, a first user can be provided with a particular video to be viewed. The particular video can be categorized in accordance with conventional approaches as being a serious video. In contrast, the first user may actually consider the particular video to be a comedic video. In this example, a second user who is a social networking connection (e.g., friend) of the first user may have been able to recognize that the particular video would be considered by the first user to be comedic. Yet based on conventional approaches, the particular video may be provided to the first user as being serious, which can be irrelevant, uninteresting, or undesirable for the first user.

Due to these or other concerns, conventional approaches can be disadvantageous or problematic. Therefore, an improved approach can be beneficial for addressing or alleviating various drawbacks associated with conventional approaches. Based on computer technology, the disclosed technology can identify a set of video categories. A first video content item can be acquired from a first user. A particular video category selected by the first user as being associated with the first video content item can be acquired from the first user. The particular video category can be selected out of the set of video categories. It can be determined that one or more videos associated with the particular video category are to be provided to a second user. The second user can be connected to the first user in a social networking system. The second user can be provided, via the social networking system, with access to the first video content item associated with the particular video category. It is contemplated that there can be many variations and/or other possibilities associated with the disclosed technology.

FIG. 1 illustrates an example system 100 including an example categorical video module 102 configured to facilitate utilizing social metrics to provide videos in video categories, according to an embodiment of the present disclosure. As shown in the example of FIG. 1, the categorical video module 102 can include a video category identification module 104, a video acquisition module 106, a video trigger module 108, and a video providing module 110. In some instances, the example system 100 can include at least one data store 120. The components (e.g., modules, elements, etc.) shown in this figure and all figures herein are exemplary only, and other implementations may include additional, fewer, integrated, or different components. Some components may not be shown so as not to obscure relevant details.

In some embodiments, the categorical video module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the categorical video module 102 can be implemented, in part or in whole, as software running on one or more computing devices or systems, such as on a user or client computing device. For example, the categorical video module 102 or at least a portion thereof can be implemented as or within an application (e.g., app), a program, an applet, or an operating system, etc., running on a user computing device or a client computing system, such as the user device 710 of FIG. 7. In another example, the categorical video module 102 or at least a portion thereof can be implemented using one or more computing devices or systems that include one or more servers, such as network servers or cloud servers. In some instances, the categorical video module 102 can, in part or in whole, be implemented within or configured to operate in conjunction with a social networking system (or service), such as the social networking system 730 of FIG. 7. It should be appreciated that there can be many variations or other possibilities.

The video category identification module 104 can be configured to facilitate identifying a set of video categories. In general, a video category can refer to a type, kind, genre, and/or class, etc., of video. In some implementations, the identified set of video categories can correspond to classifications and/or channels for various videos provided by or accessible via a media content online resource, such as a media content resource provided by or associated with the social networking system 730. Each video can be labeled with or categorized into one or more of the video categories.

In one example, the set of video categories can be identified to include (but is not limited to) at least one of a news video category, a comedy video category, a sports video category, a life video category, a travel video category, and/or an entertainment video category, etc. In some cases, the identified set of video categories can be uniform across multiple users (e.g., all user accounts) of the media content online resource. For instance, each user account can access these identified video categories. In some cases, user accounts can have access to these identified video categories by default, but can create, add, edit, or remove certain video categories. Additionally, in some embodiments, at least some video categories can be automatically generated (e.g., without manual curation). The at least some video categories can, for example, be automatically generated across a population selected based on location, age, and/or other characteristics, etc. It should be appreciated that many variations associated with the disclosed technology are possible.

In some embodiments, the video category identification module 104 can be configured to facilitate identifying the set of video categories by calculating a respective popularity metric for each video category in a plurality of video categories (e.g., all possible, existing, and/or common video categories of the media content online resource at a given time). The set of video categories can be identified based on the respective popularity metric for each video category. For instance, each video category out of the plurality of video categories can receive a quantity of social engagement or social interaction (i.e., social data). In some cases, quantities of social engagement or interaction can be weighted to improve or take into account the quality of the social data. The popularity metrics can be calculated based on such quantities of social engagement or social interaction, such as likes, dislikes, comments, replies, mentions, and/or shares, etc. In some cases, identifying the set of video categories based on the respective popularity metric for each video category can further comprise selecting a specified quantity of video categories that have highest popularity metrics. For example, the top X amount (i.e., a predefined amount) of video categories with the highest popularity metrics can be identified as the set of video categories. Further, in some instances, identifying the set of video categories based on the respective popularity metric for each video category can further comprise selecting one or more video categories that have popularity metrics that at least meet a specified popularity metric threshold. Again, many variations are possible. For example, in some implementations, the set of video categories can be identified based on a manual selection process, such as by one or more operators, admins, representatives, and/or users of the media content online resource.

Moreover, the video acquisition module 106 can be configured to facilitate acquiring, from a first user, a first video content item. The video acquisition module 106 can also be configured to facilitate acquiring, from the first user, a particular video category selected by the first user as being associated with the first video content item. The particular video category can be selected out of the set of video categories. For instance, the first user can upload, save, share and/or post the first video content item and can provide an indication that the first video content item belongs to the particular video category. The video acquisition module 106 will be discussed in more detail below with reference to FIG. 2A.

The video trigger module 108 can be configured to facilitate determining that one or more videos associated with the particular video category are to be provided to a second user. The second user can be connected to the first user (e.g., friends with the first user) in the social networking system. In some cases, the second user can be accessing the media content resource to view videos. For instance, the second user can correspond to a viewing user who is attempting to access a particular video category, such as a comedy video channel, under his or her account with the media content resource. The video trigger module 108 can detect the second user's attempt to access the particular video category as a trigger to provide, present, and/or display one or more videos associated with the particular video category to the second user for viewing. In this instance, the one or more videos can correspond to one or more videos categorized as being comedy videos. In another instance, the video trigger module 108 can detect that the second user is loading or refreshing videos in the media content resource, which can include at least the particular video category. The video trigger module 108 can determine that the loading or refreshing action by the second user is a trigger for videos associated with the particular video category to be provided to the second user. As discussed, it should be understood that there can be many variations or other possibilities associated with the disclosed technology.

Furthermore, the video providing module 110 can be configured to facilitate providing, via the social networking system, the second user with access to the first video content item associated with the particular video category. More details regarding the video providing module 110 will be provided below with reference to FIG. 2B.

In one example, a second video content item can be acquired by the video acquisition module 106 from a third user. The particular video category can be selected by the third user as being associated with the second video content item and this selection of the particular video category can be acquired by the video acquisition module 106 from the third user. The particular video category can be selected by the third user out of the set of video categories. The second user can be provided, by the video providing module 110, with access to the second video content item associated with the particular video category, such as when the video trigger module 108 determines that videos associated with the particular video category are to be provided to the second user. In some embodiments, an order (e.g., ranking, priority, etc.) for providing access to the first video content item and the second video content item can be determined by the video providing module 110 based on one or more social metrics associated with at least one of the first user, the second user, or the third user. In some implementations, access to the first video content item and the second video content item can be provided by the video providing module 110 to the second user via a particular video channel personalized for the second user. The particular video channel personalized for the second user can be associated with the particular video category. For instance, videos categorized by the second user's friends as being in the comedic video category can be ranked by relevance or likelihood of interest to the second user. In this instance, those videos that are sufficiently highly ranked (and thus personalized for the second user) can be presented to the second user via a comedy video channel under the second user's account at the media content resource. Again, many variations are possible.

Additionally, in some embodiments, the categorical video module 102 can be configured to communicate and/or operate with the at least one data store 120, as shown in the example system 100. The at least one data store 120 can be configured to store and maintain various types of data. In some implementations, the at least one data store 120 can store information associated with the social networking system (e.g., the social networking system 730 of FIG. 7). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 120 can store information associated with users, such as user identifiers, user information, profile information, user locations, user specified settings, content produced or posted by users, and various other types of user data. In some embodiments, the at least one data store 120 can store information that is utilized by the categorical video module 102, such as media content and information (e.g., metadata) associated with videos. Again, it is contemplated that there can be many variations or other possibilities associated with the disclosed technology.

Figure 2A:
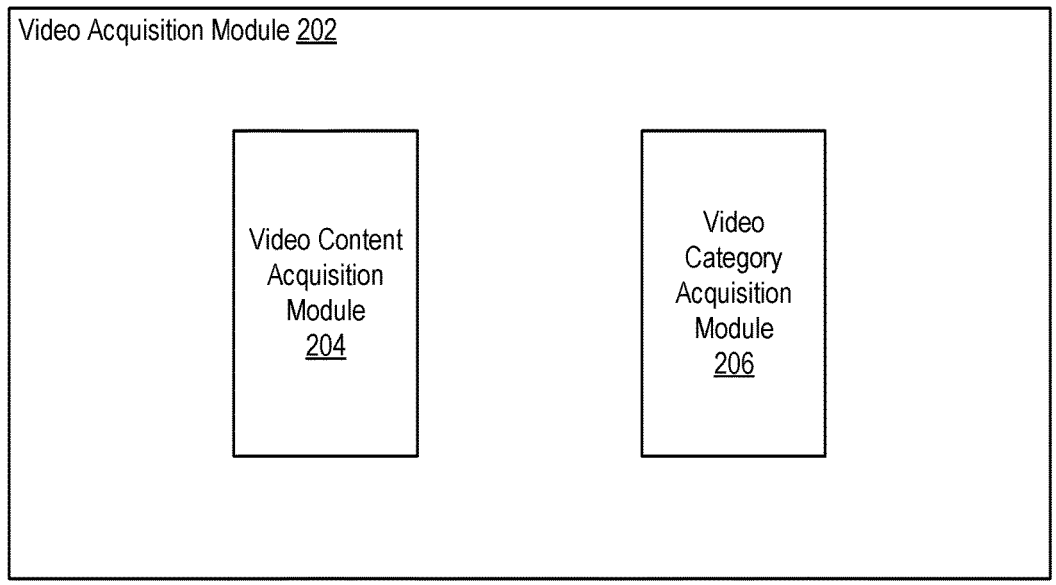
FIG. 2A illustrates an example video acquisition module configured to facilitate utilizing social metrics to provide videos in video categories, according to an embodiment of the present disclosure.

FIG. 2A illustrates an example video acquisition module 202 configured to facilitate utilizing social metrics to provide videos in video categories, according to an embodiment of the present disclosure. In some embodiments, the video acquisition module 106 of FIG. 1 can be implemented as the example video acquisition module 202. As shown in FIG. 2A, the video acquisition module 202 can include a video content acquisition module 204 and a video category acquisition module 206.

As discussed above, the video acquisition module 202 can facilitate acquiring (e.g., fetching, obtaining, receiving, identifying, etc.), from a first user, a first video content item. In some embodiments, the video acquisition module 202 can utilize the video content acquisition module 204 to acquire the first video content item from the first user. For example, the video content acquisition module 204 can acquire the first video content item, as well as additional video content items, via a social networking system (or a media content resource provided by the social networking system) based on at least one of a post action by the first user, a share action by the first user, and/or a save action by the first user, etc.

Moreover, the video acquisition module 202 can facilitate acquiring, from the first user, a particular video category selected by the first user as being associated with the first video content item, as discussed previously. The particular video category can be selected by the first user out of an identified set of video categories. In some implementations, the video acquisition module 202 can utilize the video category acquisition module 206 to acquire the particular video category that is selected by the first user as being associated with the first video content item. For instance, the video category acquisition module 206 can acquire the particular video category selected by the first user based on at least one of the post action by the first user, the share action by the first user, and/or the save action by the first user, etc. In some cases, when the first user is posting, sharing, and/or saving the first video content item, the first user can also select the particular video category as the category with which the first video content item is associated. It is contemplated that there can be many variations or other possibilities associated with the disclosed technology.

Figure 2B:
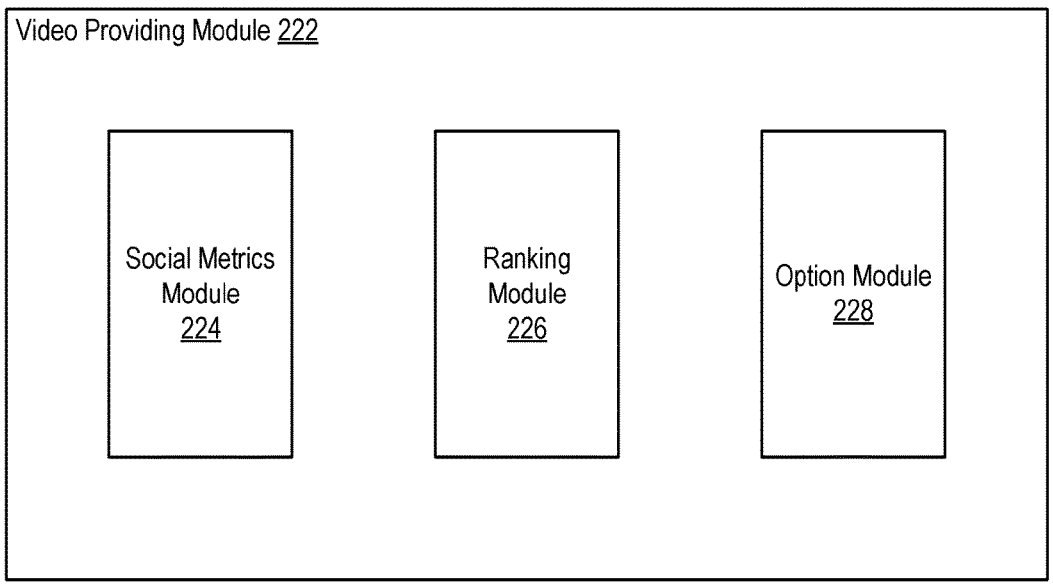
FIG. 2B illustrates an example video providing module configured to facilitate utilizing social metrics to provide videos in video categories, according to an embodiment of the present disclosure.

FIG. 2B illustrates an example video providing module 222 configured to facilitate utilizing social metrics to provide videos in video categories, according to an embodiment of the present disclosure. In some embodiments, the video acquisition module 110 of FIG. 1 can be implemented as the example video providing module 222. As shown in FIG. 2B, the video providing module 222 can include a social metrics module 224, a ranking module 226, and an option module 228.

As discussed previously, the video providing module 222 can facilitate providing, via the social networking system (or the media content resource of the social networking system), a second user with access to a first video content item associated with a particular video category and acquired from a first user. In some embodiments, the video providing module 222 can be configured to present, display, play, and/or stream the first video content item to the second user for viewing.

In one example, a second video content item can be acquired from a third user. In some cases, the third user can be connected to the second user via the social networking system. The particular video category can be selected by the third user as being associated with the second video content item and can be acquired from the third user. The particular video category can be selected out of the set of video categories. The video providing module 222 can provide, via the social networking system, the second user with access to the second video content item associated with the particular video category. In this example, the video providing module 222 can utilize the social metrics module 224 to acquire one or more social metrics associated with at least one of the first user, the second user, or the third user. For instance, the social metrics module 224 can determine that the first and second users have a higher affinity or social coefficient than the second and third users. In another instance, the social metrics module 224 can determine that the second user has been more interested in videos acquired from the first user than from the third user. Many variations are possible.

Continuing with the previous example, the video providing module 222 can utilize the ranking module 226 to determine, based on the one or more social metrics, an order for providing access to the first video content item and the second video content item. If, for instance, the social metrics indicate that the second user has a higher social affinity to the first user than to the third user, then the ranking module 226 can rank the first video content item higher than the second video content item. Additionally or alternatively, if the social metrics indicate that the second user is more likely to be interested in videos acquired from the first user than from the third user, then the ranking module 226 can rank the first video content item higher than the second video content item. In this example, the video providing module 222 can present (if at all) the first video content item before the second video content item.

Furthermore, in some implementations, the video providing module 222 can utilize the option module 228 to provide to the second user an option for removing or hiding, from the particular video channel, at least one of the first video content item or the second video content item. In some cases, the disclosed technology can learn and improve over time based on the actions performed by the second user (or other viewing users). Again, there can be many variations or other possibilities associated with the disclosed technology.

Figure 3:
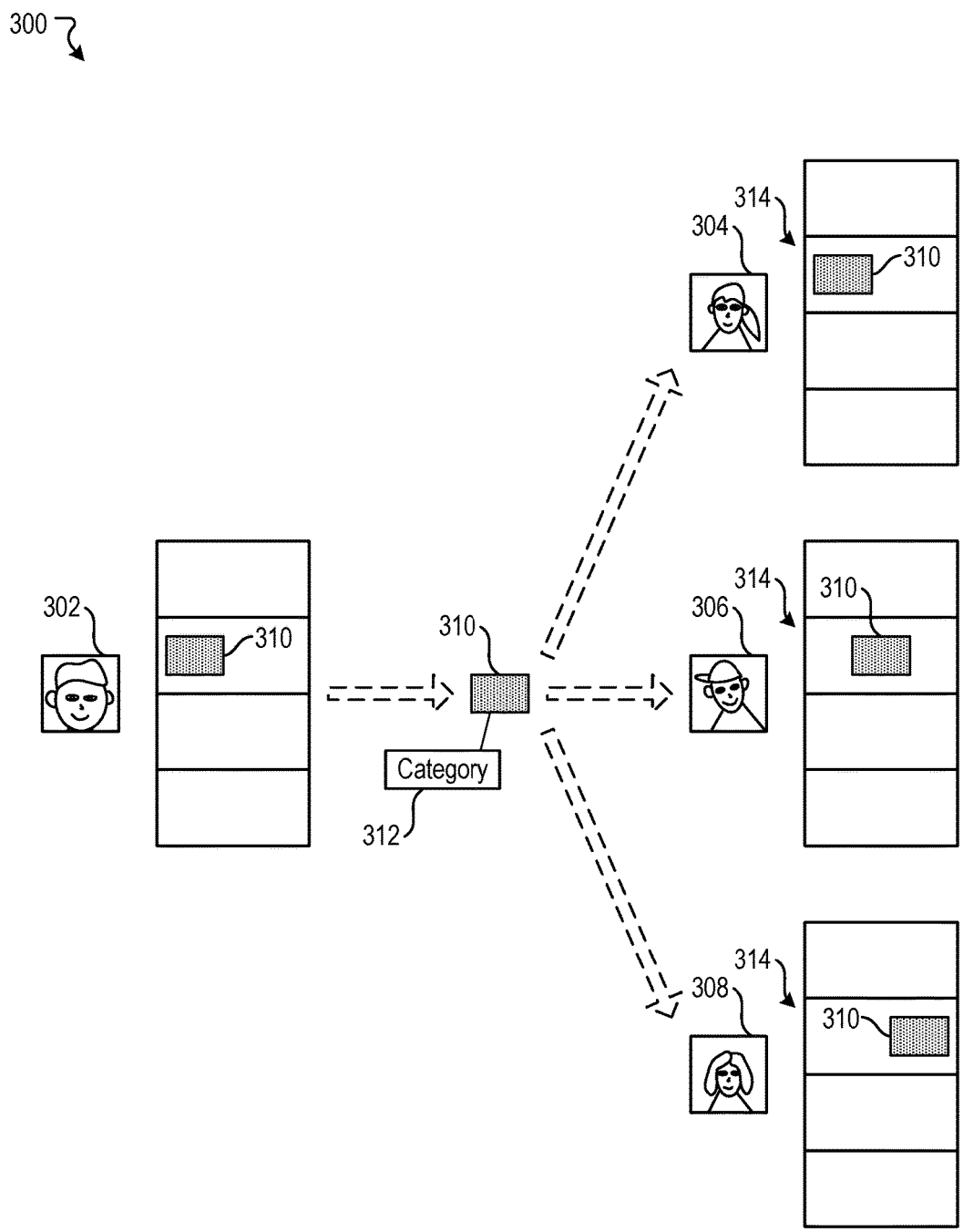
FIG. 3 illustrates an example scenario associated with utilizing social metrics to provide videos in video categories, according to an embodiment of the present disclosure.

FIG. 3 illustrates an example scenario 300 associated with utilizing social metrics to provide videos in video categories, according to an embodiment of the present disclosure. The example scenario 300 illustrates a first user 302, a second user 304, a third user 306, and a fourth user 308. The first user 302 can, for instance, be connected to (or be friends with) the second user 304, the third user 306, and the fourth user 308 via a social networking system.

In this example scenario 300, the first user 302 has shared a first video 310 and has categorized, tagged, and/or labeled the first video 310 as being associated with a particular video category 312. Since the first user 302 has explicitly categorized, tagged, and/or labeled the first video 310 as being associated with the particular video category 312, this can indicate significant intent from the first user 302 that he or she believes that the first video 310 belongs to the particular video category 312. Further, in some cases, this can indicate that he or she believes that his or her friends may consider the first video 310 to be of the particular video category 312 as well. Moreover, since the second user 304, the third user 306, and the fourth user 308 are friends with the first user 302, there can be a higher likelihood that they will also consider the first video 310 to be of the particular video category 312.

Continuing with this example, when the second user 304, the third user 306, and/or the fourth user 308 access their respective video feeds, such as via their respective accounts with a media content resource, the first video 310 can be presented in a particular video channel 314 associated with or corresponding to the particular video category 312. In some cases, a video feed can provide access to videos and can have a format and/or features that are similar to a newsfeed. Again, many variations associated with the disclosed technology are possible.

Figure 4:
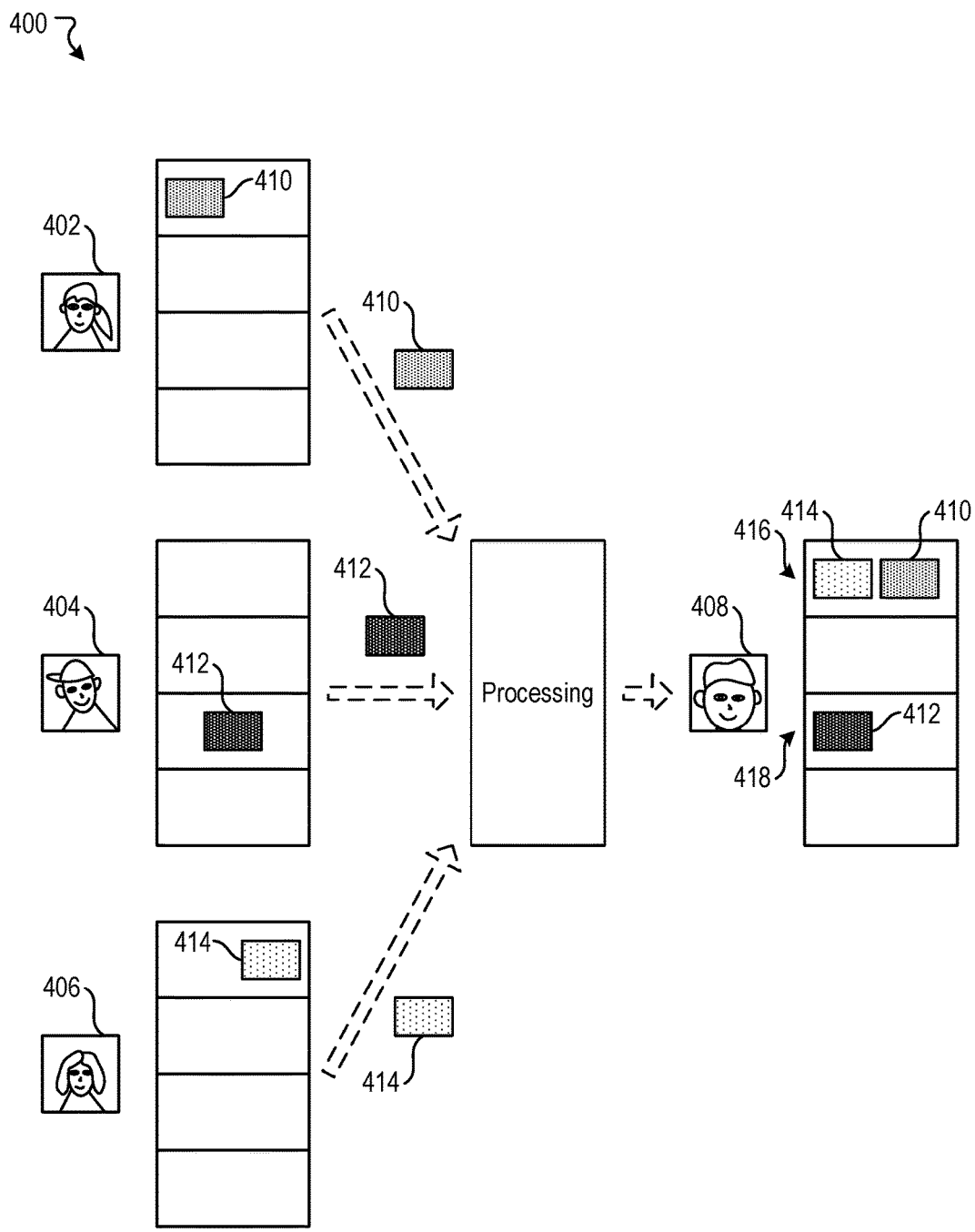
FIG. 4 illustrates an example scenario associated with utilizing social metrics to provide videos in video categories, according to an embodiment of the present disclosure.

FIG. 4 illustrates an example scenario 400 associated with utilizing social metrics to provide videos in video categories, according to an embodiment of the present disclosure. The example scenario 400 illustrates a first user 402, a second user 404, a third user 406, and a fourth user 408. The first user 402, the second user 404, and the third user 406 can, for instance, be connected to (or be friends with) the fourth user 408 via a social networking system.

In this example scenario 400, the first user 402 has shared a first video 410 and has categorized, tagged, and/or labeled the first video 410 as being associated with a first video category. The second user 404 has shared a second video 412 and has categorized, tagged, and/or labeled the second video 412 as being associated with a second video category. The third user 406 has shared a third video 414 and has categorized, tagged, and/or labeled the third video 414 as being associated with the first video category. When the fourth user 408 attempts to access his or her video feed, the videos shared and categorized by the fourth user's friends (e.g., the first user 402, the second user 404, the third user 406, etc.) can be ranked, ordered, sorted, personalized, and/or otherwise processed for the fourth user 408. As shown in this example, the third video 414 and the first video 410 can be presented to the fourth user 408 via a first video channel 416. The third video 414 can be presented before the first video 410. Also, the second video 412 can be presented via a third video channel 418. As discussed, it should be appreciated that there can be many variations or other possibilities associated with the disclosed technology.

Figure 5:
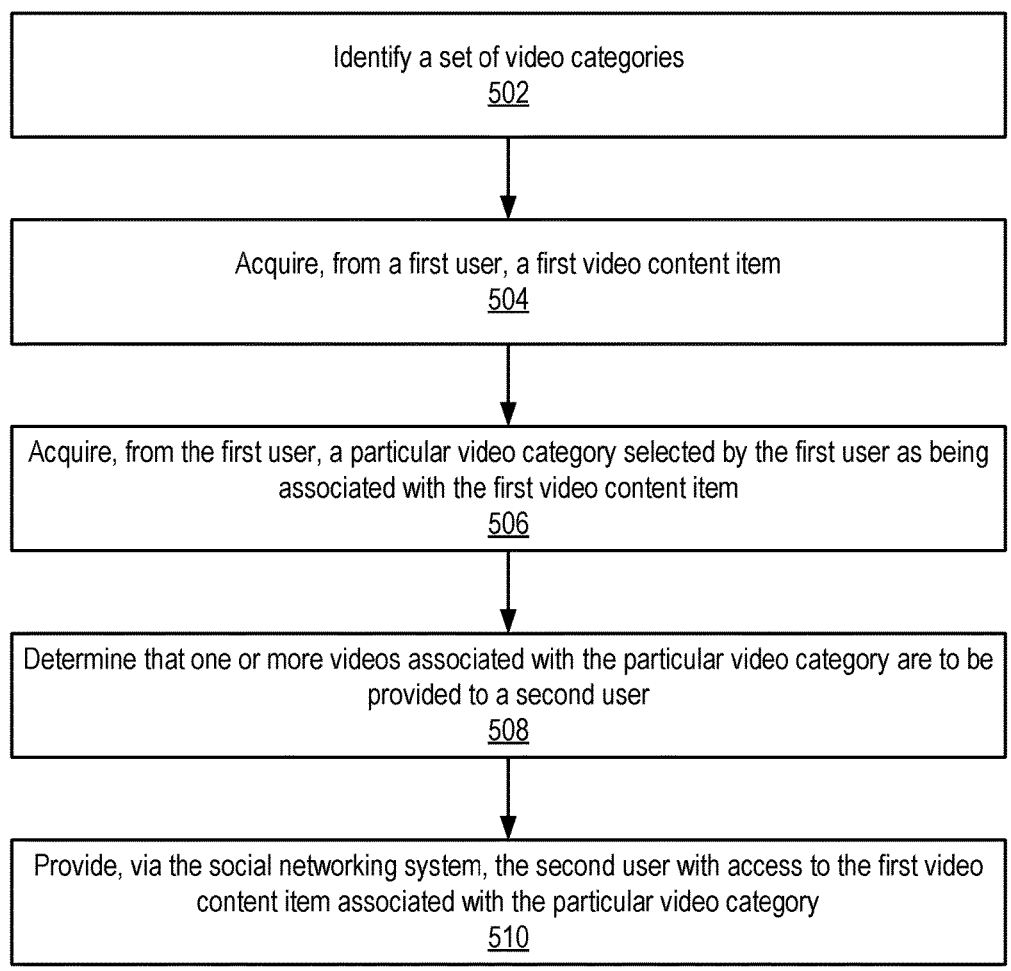
FIG. 5 illustrates an example method associated with utilizing social metrics to provide videos in video categories, according to an embodiment of the present disclosure.

FIG. 5 illustrates an example method 500 associated with utilizing social metrics to provide videos in video categories, according to an embodiment of the present disclosure. It should be appreciated that there can be additional, fewer, or alternative steps performed in similar or alternative orders, or in parallel, within the scope of the various embodiments unless otherwise stated.

At block 502, the example method 500 can identify a set of video categories. At block 504, the example method 500 can acquire, from a first user, a first video content item. At block 506, the example method 500 can acquire, from the first user, a particular video category selected by the first user as being associated with the first video content item. The particular video category can be selected out of the set of video categories. At block 508, the example method 500 can determine that one or more videos associated with the particular video category are to be provided to a second user. The second user can be connected to the first user in a social networking system. At block 510, the example method 500 can provide, via the social networking system, the second user with access to the first video content item associated with the particular video category.

Figure 6:
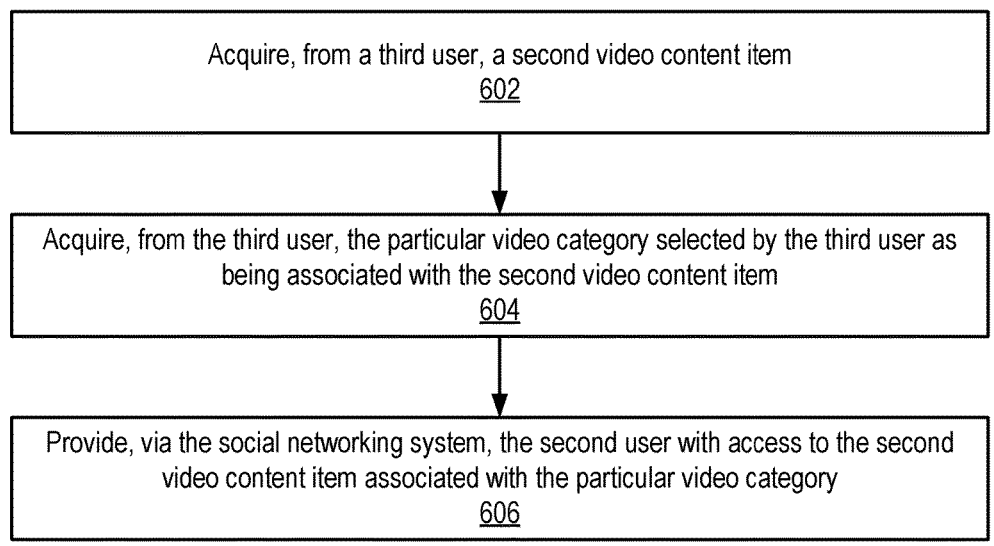
FIG. 6 illustrates an example method associated with utilizing social metrics to provide videos in video categories, according to an embodiment of the present disclosure.

FIG. 6 illustrates an example method 600 associated with utilizing social metrics to provide videos in video categories, according to an embodiment of the present disclosure. As discussed, it should be understood that there can be additional, fewer, or alternative steps performed in similar or alternative orders, or in parallel, within the scope of the various embodiments unless otherwise stated.

At block 602, the example method 600 can acquire, from a third user, a second video content item. At block 604, the example method 600 can acquire, from the third user, the particular video category selected by the third user as being associated with the second video content item. The particular video category can be selected out of the set of video categories. At block 606, the example method 600 can provide, via the social networking system, the second user with access to the second video content item associated with the particular video category.

It is contemplated that there can be many other uses, applications, features, possibilities, and/or variations associated with the various embodiments of the present disclosure. For example, users can, in some cases, choose whether or not to opt-in to utilize the disclosed technology. The disclosed technology can, for instance, also ensure that various privacy settings and preferences are maintained and can prevent private information from being divulged. In another example, various embodiments of the present disclosure can learn, improve, and/or be refined over time.

Social Networking System-Example Implementation

Figure 7:
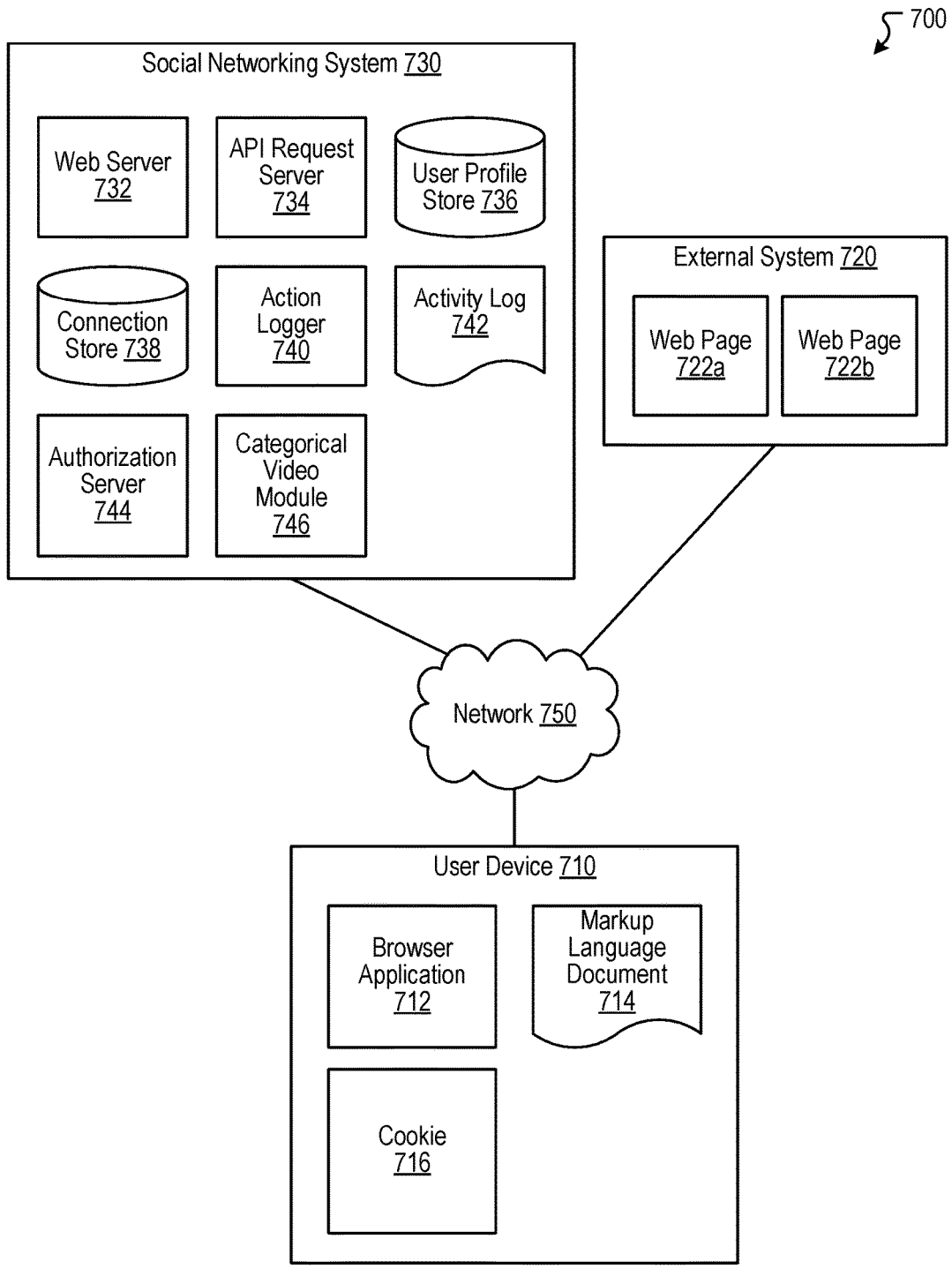
FIG. 7 illustrates a network diagram of an example system including an example social networking system that can be utilized in various scenarios, according to an embodiment of the present disclosure.

FIG. 7 illustrates a network diagram of an example system 700 that can be utilized in various scenarios, in accordance with an embodiment of the present disclosure. The system 700 includes one or more user devices 710, one or more external systems 720, a social networking system (or service) 730, and a network 750. In an embodiment, the social networking service, provider, and/or system discussed in connection with the embodiments described above may be implemented as the social networking system 730. For purposes of illustration, the embodiment of the system 700, shown by FIG. 7, includes a single external system 720 and a single user device 710. However, in other embodiments, the system 700 may include more user devices 710 and/or more external systems 720. In certain embodiments, the social networking system 730 is operated by a social network provider, whereas the external systems 720 are separate from the social networking system 730 in that they may be operated by different entities. In various embodiments, however, the social networking system 730 and the external systems 720 operate in conjunction to provide social networking services to users (or members) of the social networking system 730. In this sense, the social networking system 730 provides a platform or backbone, which other systems, such as external systems 720, may use to provide social networking services and functionalities to users across the Internet. In some embodiments, the social networking system 730 can include or correspond to a social media system (or service).

The user device 710 comprises one or more computing devices (or systems) that can receive input from a user and transmit and receive data via the network 750. In one embodiment, the user device 710 is a conventional computer system executing, for example, a Microsoft Windows compatible operating system (OS), Apple OS X, and/or a Linux distribution. In another embodiment, the user device 710 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 710 is configured to communicate via the network 750. The user device 710 can execute an application, for example, a browser application that allows a user of the user device 710 to interact with the social networking system 730. In another embodiment, the user device 710 interacts with the social networking system 730 through an application programming interface (API) provided by the native operating system of the user device 710, such as iOS and ANDROID. The user device 710 is configured to communicate with the external system 720 and the social networking system 730 via the network 750, which may comprise any combination of local area and/or wide area networks, using wired and/or wireless communication systems.

In one embodiment, the network 750 uses standard communications technologies and protocols. Thus, the network 750 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 750 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 750 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 710 may display content from the external system 720 and/or from the social networking system 730 by processing a markup language document 714 received from the external system 720 and from the social networking system 730 using a browser application 712. The markup language document 714 identifies content and one or more instructions describing formatting or presentation of the content. By executing the instructions included in the markup language document 714, the browser application 712 displays the identified content using the format or presentation described by the markup language document 714. For example, the markup language document 714 includes instructions for generating and displaying a web page having multiple frames that include text and/or image data retrieved from the external system 720 and the social networking system 730. In various embodiments, the markup language document 714 comprises a data file including extensible markup language (XML) data, extensible hypertext markup language (XHTML) data, or other markup language data. Additionally, the markup language document 714 may include JavaScript Object Notation (JSON) data, JSON with padding (JSONP), and JavaScript data to facilitate data-interchange between the external system 720 and the user device 710. The browser application 712 on the user device 710 may use a JavaScript compiler to decode the markup language document 714.

The markup language document 714 may also include, or link to, applications or application frameworks such as FLASH™ or Unity™ applications, the Silverlight™ application framework, etc.

In one embodiment, the user device 710 also includes one or more cookies 716 including data indicating whether a user of the user device 710 is logged into the social networking system 730, which may enable modification of the data communicated from the social networking system 730 to the user device 710.

The external system 720 includes one or more web servers that include one or more web pages 722a, 722b, which are communicated to the user device 710 using the network 750. The external system 720 is separate from the social networking system 730. For example, the external system 720 is associated with a first domain, while the social networking system 730 is associated with a separate social networking domain. Web pages 722a, 722b, included in the external system 720, comprise markup language documents 714 identifying content and including instructions specifying formatting or presentation of the identified content.

The social networking system 730 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 730 may be administered, managed, or controlled by an operator. The operator of the social networking system 730 may be a human being, an automated application, or a series of applications for managing content, regulating policies, and collecting usage metrics within the social networking system 730. Any type of operator may be used.

Users may join the social networking system 730 and then add connections to any number of other users of the social networking system 730 to whom they desire to be connected. As used herein, the term "friend" refers to any other user of the social networking system 730 to whom a user has formed a connection, association, or relationship via the social networking system 730. For example, in an embodiment, if users in the social networking system 730 are represented as nodes in the social graph, the term "friend" can refer to an edge formed between and directly connecting two user nodes.

Connections may be added explicitly by a user or may be automatically created by the social networking system 730 based on common characteristics of the users (e.g., users who are alumni of the same educational institution). For example, a first user specifically selects a particular other user to be a friend. Connections in the social networking system 730 are usually in both directions, but need not be, so the terms "user" and "friend" depend on the frame of reference. Connections between users of the social networking system 730 are usually bilateral ("two-way"), or "mutual," but connections may also be unilateral, or "one-way." For example, if Bob and Joe are both users of the social networking system 730 and connected to each other, Bob and Joe are each other's connections. If, on the other hand, Bob wishes to connect to Joe to view data communicated to the social networking system 730 by Joe, but Joe does not wish to form a mutual connection, a unilateral connection may be established. The connection between users may be a direct connection; however, some embodiments of the social networking system 730 allow the connection to be indirect via one or more levels of connections or degrees of separation.

In addition to establishing and maintaining connections between users and allowing interactions between users, the social networking system 730 provides users with the ability to take actions on various types of items supported by the social networking system 730. These items may include groups or networks (i.e., social networks of people, entities, and concepts) to which users of the social networking system 730 may belong, events or calendar entries in which a user might be interested, computer-based applications that a user may use via the social networking system 730, transactions that allow users to buy or sell items via services provided by or through the social networking system 730, and interactions with advertisements that a user may perform on or off the social networking system 730. These are just a few examples of the items upon which a user may act on the social networking system 730, and many others are possible. A user may interact with anything that is capable of being represented in the social networking system 730 or in the external system 720, separate from the social networking system 730, or coupled to the social networking system 730 via the network 750.

The social networking system 730 is also capable of linking a variety of entities. For example, the social networking system 730 enables users to interact with each other as well as external systems 720 or other entities through an API, a web service, or other communication channels. The social networking system 730 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 730. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 730 modifies edges connecting the various nodes to reflect the relationships and interactions.

The social networking system 730 also includes user-generated content, which enhances a user's interactions with the social networking system 730. User-generated content may include anything a user can add, upload, send, or "post" to the social networking system 730. For example, a user communicates posts to the social networking system 730 from a user device 710. Posts may include data such as status updates or other textual data, location information, images such as photos, videos, links, music or other similar data and/or media. Content may also be added to the social networking system 730 by a third party. Content "items" are represented as objects in the social networking system 730. In this way, users of the social networking system 730 are encouraged to communicate with each other by posting text and content items of various types of media through various communication channels. Such communication increases the interaction of users with each other and increases the frequency with which users interact with the social networking system 730.

The social networking system 730 includes a web server 732, an API request server 734, a user profile store 736, a connection store 738, an action logger 740, an activity log 742, and an authorization server 744. In an embodiment of the invention, the social networking system 730 may include additional, fewer, or different components for various applications. Other components, such as network interfaces, security mechanisms, load balancers, failover servers, management and network operations consoles, and the like are not shown so as to not obscure the details of the system.

The user profile store 736 maintains information about user accounts, including biographic, demographic, and other types of descriptive information, such as work experience, educational history, hobbies or preferences, location, and the like that has been declared by users or inferred by the social networking system 730. This information is stored in the user profile store 736 such that each user is uniquely identified. The social networking system 730 also stores data describing one or more connections between different users in the connection store 738. The connection information may indicate users who have similar or common work experience, group memberships, hobbies, or educational history. Additionally, the social networking system 730 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 730, such as non-person entities, buckets, cluster centers, images, interests, pages, external systems, concepts, and the like are also stored in the connection store 738.

The social networking system 730 maintains data about objects with which a user may interact. To maintain this data, the user profile store 736 and the connection store 738 store instances of the corresponding type of objects maintained by the social networking system 730. Each object type has information fields that are suitable for storing information appropriate to the type of object. For example, the user profile store 736 contains data structures with fields suitable for describing a user's account and information related to a user's account. When a new object of a particular type is created, the social networking system 730 initializes a new data structure of the corresponding type, assigns a unique object identifier to it, and begins to add data to the object as needed. This might occur, for example, when a user becomes a user of the social networking system 730, the social networking system 730 generates a new instance of a user profile in the user profile store 736, assigns a unique identifier to the user account, and begins to populate the fields of the user account with information provided by the user.

The connection store 738 includes data structures suitable for describing a user's connections to other users, connections to external systems 720 or connections to other entities. The connection store 738 may also associate a connection type with a user's connections, which may be used in conjunction with the user's privacy setting to regulate access to information about the user. In an embodiment of the invention, the user profile store 736 and the connection store 738 may be implemented as a federated database.

Data stored in the connection store 738, the user profile store 736, and the activity log 742 enables the social networking system 730 to generate the social graph that uses nodes to identify various objects and edges connecting nodes to identify relationships between different objects. For example, if a first user establishes a connection with a second user in the social networking system 730, user accounts of the first user and the second user from the user profile store 736 may act as nodes in the social graph. The connection between the first user and the second user stored by the connection store 738 is an edge between the nodes associated with the first user and the second user. Continuing this example, the second user may then send the first user a message within the social networking system 730. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 730 (or, alternatively, in an image maintained by another system outside of the social networking system 730). The image may itself be represented as a node in the social networking system 730. This tagging action may create edges between the first user and the second user as well as create an edge between each of the users and the image, which is also a node in the social graph. In yet another example, if a user confirms attending an event, the user and the event are nodes obtained from the user profile store 736, where the attendance of the event is an edge between the nodes that may be retrieved from the activity log 742. By generating and maintaining the social graph, the social networking system 730 includes data describing many different types of objects and the interactions and connections among those objects, providing a rich source of socially relevant information.

The web server 732 links the social networking system 730 to one or more user devices 710 and/or one or more external systems 720 via the network 750. The web server 732 serves web pages, as well as other web-related content, such as Java, JavaScript, Flash, XML, and so forth. The web server 732 may include a mail server or other messaging functionality for receiving and routing messages between the social networking system 730 and one or more user devices 710. The messages can be instant messages, queued messages (e.g., email), text and SMS messages, or any other suitable messaging format.

The API request server 734 allows one or more external systems 720 and user devices 710 to call access information from the social networking system 730 by calling one or more API functions. The API request server 734 may also allow external systems 720 to send information to the social networking system 730 by calling APIs. The external system 720, in one embodiment, sends an API request to the social networking system 730 via the network 750, and the API request server 734 receives the API request. The API request server 734 processes the request by calling an API associated with the API request to generate an appropriate response, which the API request server 734 communicates to the external system 720 via the network 750. For example, responsive to an API request, the API request server 734 collects data associated with a user, such as the user's connections that have logged into the external system 720, and communicates the collected data to the external system 720. In another embodiment, the user device 710 communicates with the social networking system 730 via APIs in the same manner as external systems 720.

The action logger 740 is capable of receiving communications from the web server 732 about user actions on and/or off the social networking system 730. The action logger 740 populates the activity log 742 with information about user actions, enabling the social networking system 730 to discover various actions taken by its users within the social networking system 730 and outside of the social networking system 730. Any action that a particular user takes with respect to another node on the social networking system 730 may be associated with each user's account, through information maintained in the activity log 742 or in a similar database or other data repository. Examples of actions taken by a user within the social networking system 730 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 730, the action is recorded in the activity log 742. In one embodiment, the social networking system 730 maintains the activity log 742 as a database of entries. When an action is taken within the social networking system 730, an entry for the action is added to the activity log 742. The activity log 742 may be referred to as an action log.

Additionally, user actions may be associated with concepts and actions that occur within an entity outside of the social networking system 730, such as an external system 720 that is separate from the social networking system 730. For example, the action logger 740 may receive data describing a user's interaction with an external system 720 from the web server 732. In this example, the external system 720 reports a user's interaction according to structured actions and objects in the social graph.

Other examples of actions where a user interacts with an external system 720 include a user expressing an interest in an external system 720 or another entity, a user posting a comment to the social networking system 730 that discusses an external system 720 or a web page 722*a* within the external system 720, a user posting to the social networking system 730 a Uniform Resource Locator (URL) or other identifier associated with an external system 720, a user attending an event associated with an external system 720, or any other action by a user that is related to an external system 720. Thus, the activity log 742 may include actions describing interactions between a user of the social networking system 730 and an external system 720 that is separate from the social networking system 730.

The authorization server 744 enforces one or more privacy settings of the users of the social networking system 730. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 720, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 720. One embodiment allows the specification of the set of entities to comprise an enumeration of entities. For example, the user may provide a list of external systems 720 that are allowed to access certain information. Another embodiment allows the specification to comprise a set of entities along with exceptions that are not allowed to access the information. For example, a user may allow all external systems 720 to access the user's work information, but specify a list of external systems 720 that are not allowed to access the work information. Certain embodiments call the list of exceptions that are not allowed to access certain information a "block list". External systems 720 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 744 contains logic to determine if certain information associated with a user can be accessed by a user's friends, external systems 720, and/or other applications and entities. The external system 720 may need authorization from the authorization server 744 to access the user's more private and sensitive information, such as the user's work phone number. Based on the user's privacy settings, the authorization server 744 determines if another user, the external system 720, an application, or another entity is allowed to access information associated with the user, including information about actions taken by the user.

In some embodiments, the social networking system 730 can include a categorical video module 746. The categorical video module 746 can, for example, be implemented as the categorical video module 102 of FIG. 1. As discussed previously, it should be appreciated that there can be many variations or other possibilities. For example, in some instances, the categorical video module (or at least a portion thereof) can be included or implemented in the user device 710. Other features of the categorical video module 746 are discussed herein in connection with the categorical video module 102.

Hardware Implementation

Figure 8:
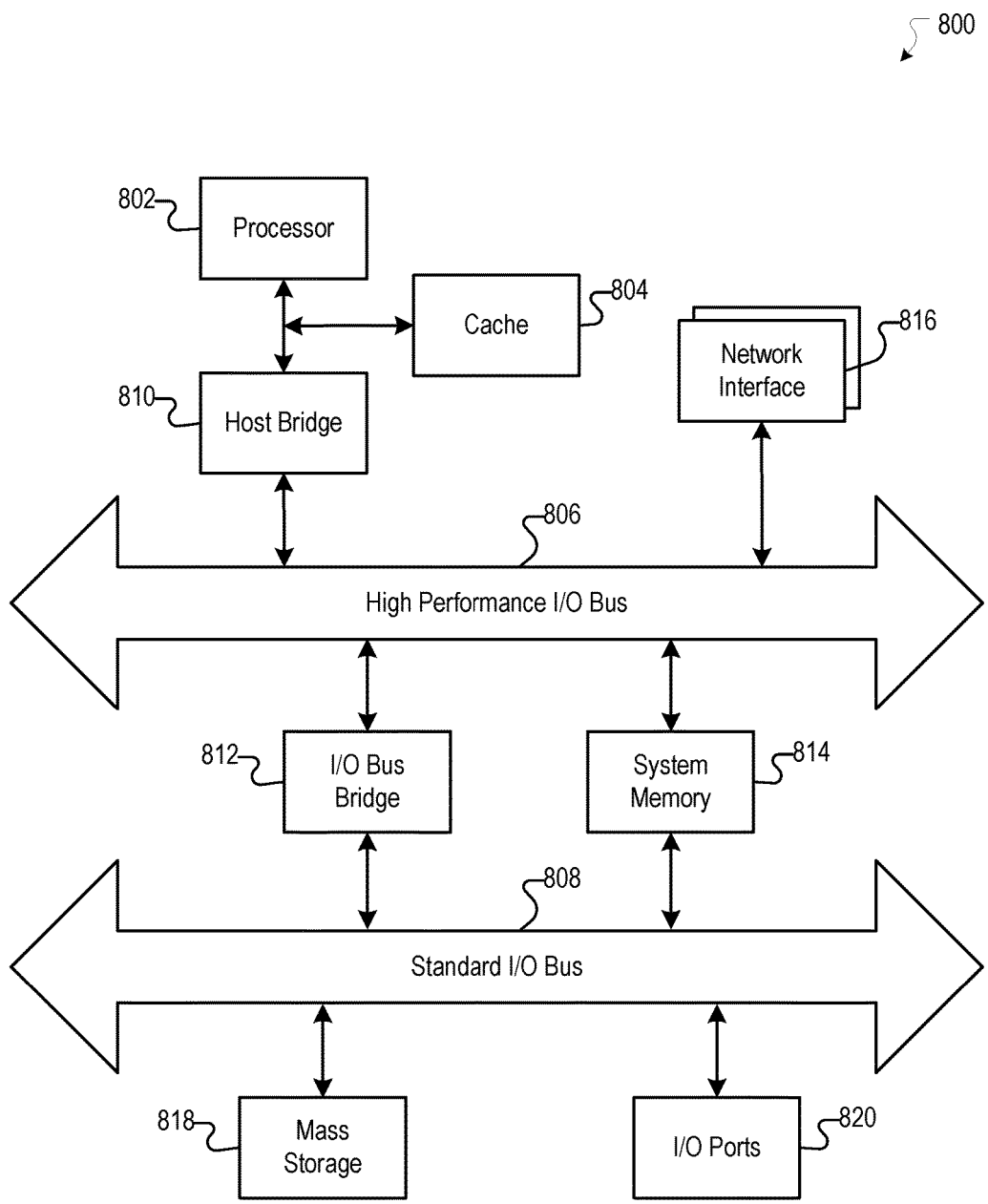
FIG. 8 illustrates an example of a computer system or computing device that can be utilized in various scenarios, according to an embodiment of the present disclosure The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

The foregoing processes and features can be implemented by a wide variety of machine and computer system architectures and in a wide variety of network and computing environments. FIG. 8 illustrates an example of a computer system 800 that may be used to implement one or more of the embodiments described herein in accordance with an embodiment of the invention. The computer system 800 includes sets of instructions for causing the computer system 800 to perform the processes and features discussed herein. The computer system 800 may be connected (e.g., networked) to other machines. In a networked deployment, the computer system 800 may operate in the capacity of a server machine or a client machine in a client-server network environment, or as a peer machine in a peer-to-peer (or distributed) network environment. In an embodiment of the invention, the computer system 800 may be the social networking system 730, the user device 710, and the external system 820, or a component thereof. In an embodiment of the invention, the computer system 800 may be one server among many that constitutes all or part of the social networking system 730.

The computer system 800 includes a processor 802, a cache 804, and one or more executable modules and drivers, stored on a computer-readable medium, directed to the processes and features described herein. Additionally, the computer system 800 includes a high performance input/output (I/O) bus 806 and a standard I/O bus 808. A host bridge 810 couples processor 802 to high performance I/O bus 806, whereas I/O bus bridge 812 couples the two buses 806 and 808 to each other. A system memory 814 and one or more network interfaces 816 couple to high performance I/O bus 806. The computer system 800 may further include video memory and a display device coupled to the video memory (not shown). Mass storage 818 and I/O ports 820 couple to the standard I/O bus 808. The computer system 800 may optionally include a keyboard and pointing device, a display device, or other input/output devices (not shown) coupled to the standard I/O bus 808. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 800, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 800 are described in greater detail below. In particular, the network interface 816 provides communication between the computer system 800 and any of a wide range of networks, such as an Ethernet (e.g., IEEE 802.3) network, a backplane, etc. The mass storage 818 provides permanent storage for the data and programming instructions to perform the above-described processes and features implemented by the respective computing systems identified above, whereas the system memory 814 (e.g., DRAM) provides temporary storage for the data and programming instructions when executed by the processor 802. The I/O ports 820 may be one or more serial and/or parallel communication ports that provide communication between additional peripheral devices, which may be coupled to the computer system 800.

The computer system 800 may include a variety of system architectures, and various components of the computer system 800 may be rearranged. For example, the cache 804 may be on-chip with processor 802. Alternatively, the cache 804 and the processor 802 may be packed together as a "processor module", with processor 802 being referred to as the "processor core". Furthermore, certain embodiments of the invention may neither require nor include all of the above components. For example, peripheral devices coupled to the standard I/O bus 808 may couple to the high performance I/O bus 806. In addition, in some embodiments, only a single bus may exist, with the components of the computer system 800 being coupled to the single bus. Moreover, the computer system 800 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 800 that, when read and executed by one or more processors, cause the computer system 800 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 800, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 802. Initially, the series of instructions may be stored on a storage device, such as the mass storage 818. However, the series of instructions can be stored on any suitable computer readable storage medium. Furthermore, the series of instructions need not be stored locally, and could be received from a remote storage device, such as a server on a network, via the network interface 816. The instructions are copied from the storage device, such as the mass storage 818, into the system memory 814 and then accessed and executed by the processor 802. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 800 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments. Furthermore, reference in this specification to "based on" can mean "based, at least in part, on", "based on at least a portion/part of", "at least a portion/part of which is based on", and/or any combination thereof.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   identifying, by a computing system, a set of video categories;
   acquiring, by the computing system, from a first user, a first video content item;
   acquiring, by the computing system, from the first user, a particular video category selected by the first user as being associated with the first video content item, the particular video category being selected out of the set of video categories;
   determining, by the computing system, that one or more videos associated with the particular video category are to be provided to a second user, the second user being connected to the first user in a social networking system;
   providing, by the computing system, via the social networking system, the second user with access to the first video content item in a personalized video channel on the social networking system associated with the second user and the particular video category based on a determination that the first user is connected to the second user on the social networking system and based on the first user's selection of the particular video category as being associated with the first video content item;
   ranking, by the computing system, the first video content item within a plurality of video content items in the personalized video channel based on a social affinity of the second user to the first user, wherein the ranking the first video content item is performed automatically without manual curation by the second user; and determining, by the computing system, an order of presentation for presenting the plurality of video content items in the personalized video channel based on the ranking.

2. The computer-implemented method of claim 1, further comprising:
acquiring, from a third user, a second video content item;
acquiring, from the third user, the particular video category selected by the third user as being associated with the second video content item, the particular video category being selected out of the set of video categories; and
providing, via the social networking system, the second user with access to the second video content item in the personalized video channel based on a determination that the third user is connected to the second user on the social networking system and based on the third user's selection of the particular video category as being associated with the second video content item.

3. The computer-implemented method of claim 2, further comprising:
ranking the second video content item within the plurality of video content items in the personalized video channel based on a social affinity of the second user to the third user, wherein
the second video content item is ranked ahead of the first video content item based on the second user having a higher social affinity to the third user than the first user.

4. The computer-implemented method of claim 1, further comprising:
providing to the second user an option for removing or hiding, from the personalized video channel, at least one of the first video content item or the second video content item.

5. The computer-implemented method of claim 1, wherein the first video content item and the particular video category are acquired via the social networking system based on at least one of a post action by the first user, a share action by the first user, or a save action by the first user.

6. The computer-implemented method of claim 1, wherein the set of video categories includes at least one of a news video category, a comedy video category, a sports video category, a life video category, a travel video category, or an entertainment video category.

7. The computer-implemented method of claim 1, wherein identifying the set of video categories further comprises:
calculating a respective popularity metric for each video category in a plurality of video categories; and
identifying the set of video categories based on the respective popularity metric for each video category.

8. The computer-implemented method of claim 7, wherein identifying the set of video categories based on the respective popularity metric for each video category further comprises:
selecting a specified quantity of video categories that have highest popularity metrics.

9. The computer-implemented method of claim 7, wherein identifying the set of video categories based on the respective popularity metric for each video category further comprises:
selecting one or more video categories that have popularity metrics that at least meet a specified popularity metric threshold.

10. A system comprising:
at least one processor; and
a memory storing instructions that, when executed by the at least one processor, cause the system to perform:
identifying a set of video categories;
acquiring, from a first user, a first video content item;
acquiring, from the first user, a particular video category selected by the first user as being associated with the first video content item, the particular video category being selected out of the set of video categories;
determining that one or more videos associated with the particular video category are to be provided to a second user, the second user being connected to the first user in a social networking system;
providing, via the social networking system, the second user with access to the first video content item in a personalized video channel on the social networking system associated with the second user and the particular video category based on a determination that the first user is connected to the second user on the social networking system and based on the first user's selection of the particular video category as being associated with the first video content item;
ranking the first video content item within a plurality of video content items in the personalized video channel based on a social affinity of the second user to the first user, wherein the ranking the first video content item is performed automatically without manual curation by the second user; and
determining an order of presentation for presenting the plurality of video content items in the personalized video channel based on the ranking.

11. The system of claim 10, wherein the instructions cause the system to further perform:
acquiring, from a third user, a second video content item;
acquiring, from the third user, the particular video category selected by the third user as being associated with the second video content item, the particular video category being selected out of the set of video categories; and
providing, via the social networking system, the second user with access to the second video content item in the personalized video channel based on a determination that the third user is connected to the second user on the social networking system and based on the third user's selection of the particular video category as being associated with the second video content item.

12. The system of claim 11, wherein the instructions cause the system to further perform:
ranking the second video content item within the plurality of video content items in the personalized video channel based on a social affinity of the second user to the third user, wherein
the second video content item is ranked ahead of the first video content item based on the second user having a higher social affinity to the third user than the first user.

13. The system of claim 10, wherein the first video content item and the particular video category are acquired via the social networking system based on at least one of a post action by the first user, a share action by the first user, or a save action by the first user.

14. The system of claim 10, wherein the set of video categories includes at least one of a news video category, a comedy video category, a sports video category, a life video category, a travel video category, or an entertainment video category.

15. A non-transitory computer-readable storage medium including instructions that, when executed by at least one processor of a computing system, cause the computing system to perform a method comprising:
- identifying a set of video categories;
- acquiring, from a first user, a first video content item;
- acquiring, from the first user, a particular video category selected by the first user as being associated with the first video content item, the particular video category being selected out of the set of video categories;
- determining that one or more videos associated with the particular video category are to be provided to a second user, the second user being connected to the first user in a social networking system;
- providing, via the social networking system, the second user with access to the first video content item in a personalized video channel on the social networking system associated with the second user and the particular video category based on a determination that the first user is connected to the second user on the social networking system and based on the first user's selection of the particular video category as being associated with the first video content item;
- ranking the first video content item within a plurality of video content items in the personalized video channel based on a social affinity of the second user to the first user, wherein the ranking the first video content item is performed automatically without manual curation by the second user; and
- determining an order of presentation for presenting the plurality of video content items in the personalized video channel based on the ranking.

16. The non-transitory computer-readable storage medium of claim 15, wherein the instructions cause the computing system to further perform:
- acquiring, from a third user, a second video content item;
- acquiring, from the third user, the particular video category selected by the third user as being associated with the second video content item, the particular video category being selected out of the set of video categories; and
- providing, via the social networking system, the second user with access to the second video content item in the personalized video channel based on a determination that the third user is connected to the second user on the social networking system and based on the third user's selection of the particular video category as being associated with the second video content item.

17. The non-transitory computer-readable storage medium of claim 16, wherein the instructions cause the computing system to further perform:
- ranking the second video content item within the plurality of video content items in the personalized video channel based on a social affinity of the second user to the third user, wherein
- the second video content item is ranked ahead of the first video content item based on the second user having a higher social affinity to the third user than the first user.

18. The non-transitory computer-readable storage medium of claim 15, wherein the first video content item and the particular video category are acquired via the social networking system based on at least one of a post action by the first user, a share action by the first user, or a save action by the first user.

19. The non-transitory computer-readable storage medium of claim 15, wherein the set of video categories includes at least one of a news video category, a comedy video category, a sports video category, a life video category, a travel video category, or an entertainment video category.

* * * * *